(12) United States Patent
Cronin et al.

(10) Patent No.: US 9,555,921 B1
(45) Date of Patent: Jan. 31, 2017

(54) PORTABLE COOLER

(71) Applicant: ProSports Technologies, LLC, Miami, FL (US)

(72) Inventors: John E. Cronin, Bonita Springs, FL (US); Nick Reasner, Chicago, IL (US)

(73) Assignee: PROSPORTS TECHNOLOGIES, LLC, Miami, FL (US)

( * ) Notice: Subject to any disclaimer, the term of this patent is extended or adjusted under 35 U.S.C. 154(b) by 0 days.

(21) Appl. No.: 14/798,279

(22) Filed: Jul. 13, 2015

Related U.S. Application Data

(60) Provisional application No. 62/023,510, filed on Jul. 11, 2014.

(51) Int. Cl.
*B62B 3/02* (2006.01)
*B65D 6/24* (2006.01)
*B62B 3/00* (2006.01)

(52) U.S. Cl.
CPC ........... *B65D 11/1873* (2013.01); *B62B 3/003* (2013.01); *B62B 3/025* (2013.01); *B65D 2313/00* (2013.01)

(58) Field of Classification Search
CPC ..... B65D 7/24; B65D 7/40; B65D 2519/0093; B65D 2519/0096; B65D 11/1873; B65D 9/12; B62B 1/12; B62B 5/0083; B62B 3/25; B62B 3/16; B62B 2205/04
See application file for complete search history.

(56) References Cited

U.S. PATENT DOCUMENTS

| 3,005,282 | A | * | 10/1961 | Godtfred | A63H 33/086 446/128 |
|---|---|---|---|---|---|
| 3,081,897 | A | * | 3/1963 | Wallrab | B65D 11/1873 206/511 |
| 3,093,259 | A | * | 6/1963 | Morrison | B65D 11/1873 220/4.34 |
| 3,160,307 | A | * | 12/1964 | Morrison | B65D 11/1873 165/135 |
| 3,331,613 | A | | 7/1967 | Popelka | |
| 3,374,914 | A | * | 3/1968 | Adam | B65D 11/1873 217/12 R |
| 3,410,441 | A | * | 11/1968 | Rhyne | A47B 88/0014 220/4.28 |
| 3,448,775 | A | * | 6/1969 | Foglia | B29C 51/08 138/173 |
| 3,877,602 | A | * | 4/1975 | Clark | B65D 11/1873 217/43 R |
| 4,492,153 | A | * | 1/1985 | Grabowski | B65D 11/1873 206/508 |
| 4,561,554 | A | * | 12/1985 | Swincicki | B65D 11/12 206/403 |

(Continued)

OTHER PUBLICATIONS

"60-Can Collapsible Wheeled Cooler", Coleman, Jun. 9, 2014.

(Continued)

*Primary Examiner* — Emma K Frick
(74) *Attorney, Agent, or Firm* — Polsinelli LLP

(57) ABSTRACT

The present invention includes a portable, snap-together cooler and methods for providing a portable, snap-together cooler. The cooler may include six panels, wherein each of the panels includes connector elements that snap onto other connector elements to assemble the cooler. Each of the six panels may include attachment elements that may be used to secure each of the panels onto at least one other panel when the panels are stacked.

6 Claims, 3 Drawing Sheets

(56) References Cited

U.S. PATENT DOCUMENTS

| | | | | |
|---|---|---|---|---|
| 4,679,242 A | * | 7/1987 | Brockhaus | A45C 3/04 190/1 |
| 4,796,909 A | | 1/1989 | Kirkendall | |
| 5,080,387 A | | 1/1992 | Ryals | |
| 5,100,198 A | | 3/1992 | Baltzell | |
| 5,169,164 A | | 12/1992 | Bradford | |
| 5,236,099 A | * | 8/1993 | Fties | B65D 19/0016 220/4.31 |
| 5,249,823 A | | 10/1993 | McCoy et al. | |
| 5,285,656 A | | 2/1994 | Peters | |
| 5,299,817 A | | 4/1994 | Chang | |
| 5,313,817 A | | 5/1994 | Meinders | |
| 5,328,192 A | | 7/1994 | Thompson | |
| D358,921 S | | 5/1995 | Abbema | |
| 5,413,236 A | * | 5/1995 | Kenevan | B65D 11/18 220/23.4 |
| 5,465,996 A | | 11/1995 | Wisz | |
| 5,597,084 A | * | 1/1997 | Parasin | B65D 11/1873 206/600 |
| 5,599,031 A | | 2/1997 | Hodges | |
| 5,622,276 A | | 4/1997 | Simmons | |
| 5,779,252 A | | 7/1998 | Bolton | |
| 5,797,508 A | * | 8/1998 | Loftus | B65D 11/1833 220/6 |
| 5,826,893 A | | 10/1998 | Snoeyenbos | |
| 6,016,933 A | | 1/2000 | Daily et al. | |
| 6,024,223 A | * | 2/2000 | Ritter | B65D 19/18 206/386 |
| 6,109,625 A | | 8/2000 | Hewitt | |
| 6,109,644 A | | 8/2000 | Cox | |
| 6,488,304 B2 | | 12/2002 | Krawczyk | |
| 6,783,147 B1 | * | 8/2004 | Green, Sr. | B62B 1/20 280/47.26 |
| 6,966,449 B2 | * | 11/2005 | Williams | B65D 11/1873 206/509 |
| 7,055,642 B1 | | 6/2006 | Chambers et al. | |
| 7,147,125 B1 | | 12/2006 | Slovak et al. | |
| 7,188,491 B2 | | 3/2007 | Donald, II et al. | |
| 7,407,032 B1 | | 8/2008 | Chambers et al. | |
| 7,478,734 B2 | * | 1/2009 | Vargas | B65D 7/24 220/4.34 |
| D600,873 S | | 9/2009 | Banasik et al. | |
| D611,219 S | | 3/2010 | Banasik et al. | |
| 7,909,000 B1 | * | 3/2011 | O'Neill | A01K 5/01 119/61.1 |
| 9,278,802 B2 | * | 3/2016 | Huang | B65D 7/24 |
| 2003/0155748 A1 | | 8/2003 | Picard et al. | |
| 2003/0183544 A1 | * | 10/2003 | Lawrence | B65D 19/12 206/335 |
| 2004/0124191 A1 | * | 7/2004 | Colladon | B65D 21/083 220/4.01 |
| 2004/0173610 A1 | * | 9/2004 | Gregorio Gracia | B65D 11/1873 220/4.28 |
| 2007/0137222 A1 | | 6/2007 | Kastanek et al. | |
| 2007/0145051 A1 | * | 6/2007 | Uffner | B62B 3/02 220/4.28 |
| 2008/0209776 A1 | | 9/2008 | Suprina | |
| 2010/0126196 A1 | | 5/2010 | McCance | |
| 2013/0146606 A1 | * | 6/2013 | Blay Orenga | B65D 11/1873 220/628 |
| 2013/0193673 A1 | | 8/2013 | Vanderberg et al. | |
| 2014/0326719 A1 | * | 11/2014 | Huang | B65D 7/24 220/4.28 |
| 2015/0048082 A1 | * | 2/2015 | Galal | A01G 9/02 220/4.12 |
| 2015/0239605 A1 | * | 8/2015 | Campos | B65D 11/1873 403/2 |

OTHER PUBLICATIONS

"Flip Box—Collapsible Iceless Cooler: Sports & Outdoors", Amazon.com, Jun. 9, 2014.
"Flip-box Folding Esky Box", Garillia.com.au, Jun. 9, 2014.
"Mac Sports Collapsible Red Wagon with Cooler", Blain's Farm & Fleet, Jun. 3, 2014.
"Staples Expanding Folding Crate on Wheels", Staples, Jun. 3, 2014.
U.S. Appl. No. 14/798,341, John E. Cronin, Configurable Cooler Carrier, filed Jul. 13, 2015.
U.S. Appl. No. 14/798,170, John E. Cronin, Sports Fan Cooler Attachment for Tailgating Purposes, filed Jul. 13, 2015.
U.S. Appl. No. 14/798,341 Office Action mailed Nov. 18, 2015.
U.S. Appl. No. 14/798,341 Final Office Action mailed Mar. 17, 2016.
U.S. Appl. No. 14/798,170 Office Action mailed Mar. 10, 2016.
U.S. Appl. No. 14/798,170 Final Office Action mailed Sep. 13, 2016.

\* cited by examiner

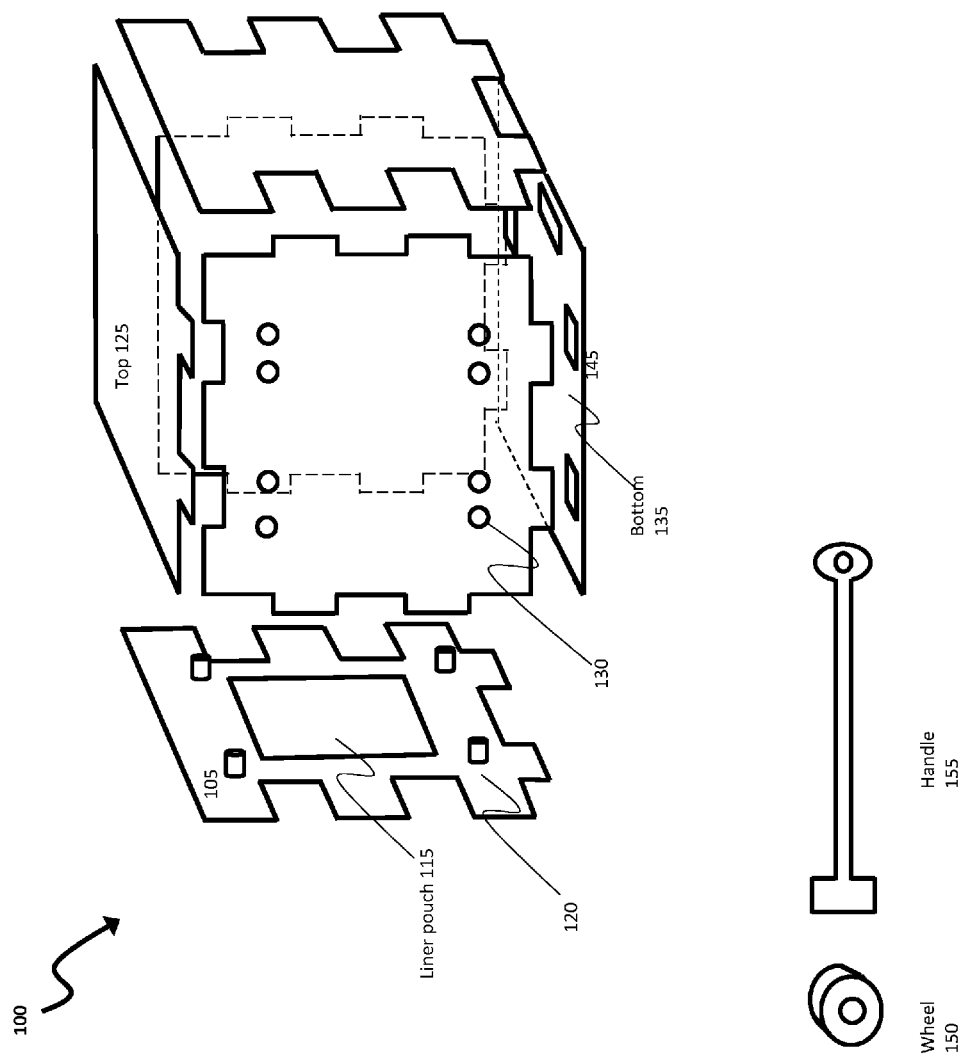

PORTABLE COOLER

CROSS-REFERENCE TO RELATED APPLICATIONS

This application claims the priority benefit of U.S. provisional application No. 62/023,510, filed on Jul. 11, 2014 and titled "Expandable Collapsible Snap Together Cooler," the disclosure of which is incorporated herein by reference.

BACKGROUND OF THE INVENTION

Field of the Invention

The present invention relates generally to providing a cooler. More specifically, the present invention relates to providing a cooler that may be assembled and disassembled.

Description of the Related Art

A user currently has a variety of options for keeping food and beverages cold while away from a refrigerator. A user may require a cooler for outdoor gatherings such as parties or sports events. A user may need to carry the cooler, food, and beverages a long distance. To transport the food and beverages, a user may, for example, need to make multiple trips between a car and a campground. The user may use a cooler, use an insulated bag, or bring a container and ice to keep food and beverages cold.

It is difficult, however, to provide a portable solution for keeping a large amount of food and beverages cold. The user may use an insulated bag when only a limited amount of cold food or beverages are required. The user may use a large cooler or a container with ice, but the options are not portable and cannot be easily stored when not in use.

There is a need in the art for improved systems and methods for enhancing audience sensory experience.

SUMMARY OF THE PRESENTLY CLAIMED INVENTION

One exemplary portable cooler apparatus includes a body having a substantially rectangular shape. The body includes a bottom panel having a plurality of slits positioned along an inner perimeter, four side panels, a top panel having at least one male hinge for insertion into the at least one female hinge such that the top panel may rotate to seal and unseal the closed container, a plurality of female connectors on an outer body surface, and a plurality of male connectors on an inner body surface. Each of the four side panels include a bottom edge shaped to fit into the plurality of slits, two side edges, and a top edge. Each of the four side panels have ridged sides such that the four side panels snap into the plurality of slits. Each of the two side edges is shaped to securely connect with a side edge of another side panel and form a closed container when the bottom panel and the four side panels are assembled. Each of the four side panels have ridged sides such that the four side panels snap together when connected. One of the four side panels include at least one female hinge at the top edge. The inner body surface is insulated. The body is formed by assembling the bottom panel, the four side panels, and the top panel and may be disassembled and reassembled, and wherein the plurality of male connectors and the plurality of female connectors are arranged such that the plurality of male connectors align with and securely insert into the plurality of female connectors when the top panel, the bottom panel, and the four side panels are disassembled and stacked together.

One exemplary method for providing a portable cooler describes providing a top panel, a bottom panel, and the four side panels. The top panel, the bottom panel, and the four side panels are insulated to maintain a temperature in a closed container. The top panel, the bottom panel, and the four side panels each have a plurality of insertion elements and a plurality of receiving elements such that the top panel, the bottom panel, and the four side panels may be securely connected by inserting the plurality of insertion elements into the plurality of receiving elements to form a container. The top panel, the bottom panel, and the four side panels each have a plurality of male connectors on an inner surface and a plurality of female connectors on an outer surface. The method also describes providing a connector element on the top panel and a complimentary connector element on one of the four side panels. The connector element and the complimentary connector element may join such that the top panel may rotate. The method also describes allowing a user to connect the top panel, the bottom panel, and the four side panels.

BRIEF DESCRIPTION OF THE DRAWINGS

FIG. 1A illustrates an exploded view of a portable, snap-together cooler.

DETAILED DESCRIPTION

Figure 1B:
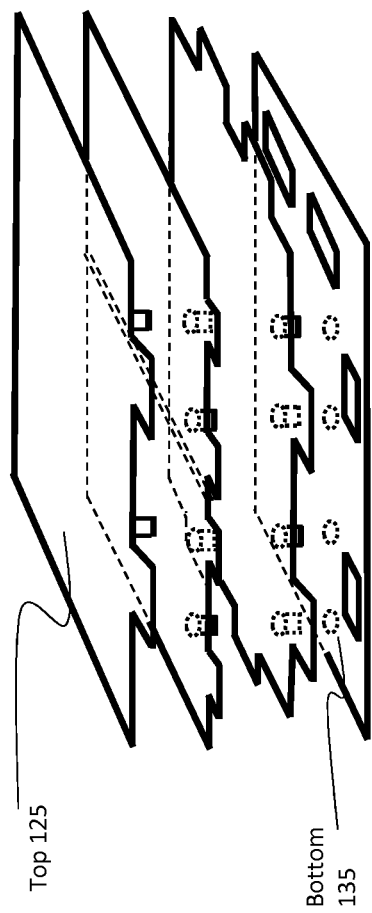
FIG. 1B illustrates an exploded view of a cooler in a stacked configuration.

The present invention includes a portable, snap-together cooler and methods for providing a portable, snap-together cooler. The cooler may include six panels, wherein each of the panels may include connector elements that snap onto other connector elements to assemble the cooler. Each of the six panels may include attachment elements that may be used to secure each of the panels onto at least one other panel when the panels are stacked.

FIG. 1A illustrates an exploded view of a portable, snap-together cooler 100. The cooler 100 of FIG. 1 may include a body 140 having a bottom panel 135, four side panels 105, a top panel 125, a plurality of female connectors 130, and a plurality of male connectors 120. The cooler 100 may also include a handle 155 and a plurality of wheels 150.

The body 105 may be formed by assembling the bottom panel 135, the four side panels 105, and the top panel 125. The panels 135, 105, 125 may be shaped to fit together to form a rectangular body. The panels 135, 105, 125 may be ridged at a plurality of contact points where a panel 135, 105, 125 connects with another panel 135, 105, 125. The ridge may require a user to exert force when connecting a panel to another panel. The ridge may allow the panels 135, 105, 125 to snap together such that the panels 135, 105, 125 form a sturdy container. The cooler 100 may hold heavy objects and withstand jostling during transportation. The panels 135, 105, 125 may be disassembled and reassembled to form the cooler 100. The panels 135, 105, 125 may fit together such that the panels 135, 105, 125 are flushed and an outer surface of the assembled cooler 100 is substantially flat. The panels 135, 105, 125 may fit together such that the cooler 100 is a closed container with no holes where the panels 135, 105, 125 meet. An inner surface of the cooler 100 may be insulated to maintain the temperature inside the cooler 100.

The bottom panel 135 may have a plurality of slits 145 positioned along an inner perimeter. The four side panels 105 may be shaped to fit into the plurality of slits. Each of the four side panels 105, may be shaped to connect with two other side panels. Each of the four side panels 105 may have three puzzle-like edges. Each of the three puzzle-like edges may compliment an edge of another side panel or compliment the plurality of slits 145. In other embodiments, each of the four side panels 105 may have two puzzle-like edges, wherein each of the edges may compliment an edge of another side panel. The side panels 105 may be shaped to connect with another side panel to form a substantially right angle.

One of the four side panels may include at least one female hinge at a top edge. The top panel 125 may have at least one male hinge for insertion into the at least one female hinge. The male and female hinges may allow the top panel 125 to attach to a side panel 105 and serve as a top for the cooler. When the cooler 100 is assembled, the user may open or close the cooler 100 by rotating the hinged top panel 125.

The inner body surface may include a pouch. The pouch may hold a liner for the cooler 100. The liner may be made of a waterproof material. The liner may be removed from the pouch and securely attached to the cooler 100. The liner may have a plurality of snap elements. The side panels 105 may have a plurality of complimentary snap elements such that the plurality of snap elements may snap onto the plurality of complimentary snap elements to secure the liner. The liner may be made of collapsible material such that the liner may fit into the pouch. The liner may be made of expandable material such that the liner may be expanded to line the inner surface. The liner may substantially cover the entire inner surface.

The bottom panel 135 and side panels 105 may include a wheel-attaching element for at least one of a plurality of wheels 150. At least one wheel may be attached to at least two sides of the cooler 100, wherein the two sides are opposing sides. The plurality of wheels 150 may be removed and reattached to the cooler 100. The plurality of wheels 150 may allow a user to roll the cooler 100. The four side panels 105 may include a handle-attaching element for the handle 155. The handle 155 may allow a user to hold or pull the cooler by the handle 155. The handle 155 may be detached and reattached to the cooler 100.

FIG. 1B illustrates an exploded view of the cooler 100 in a stacked configuration. The plurality of female connectors 130 may be on the outer surface. The plurality of male connectors 120 may be on an inner surface. The plurality of male connectors 120 and the plurality of female connectors 130 may be arranged such that the plurality of male connectors align with and securely insert into the plurality of female connectors when the top panel, the bottom panel, and the four side panels are disassembled and stacked together. The panels 135, 105, 125 may be disassembled and stacked to allow for ease of storage and portability when the cooler 100 is not in use. The handle 155 and the plurality of wheels 150 may each be attached to a panel while the panels 135, 105, 125 are stacked together.

Figure 2:
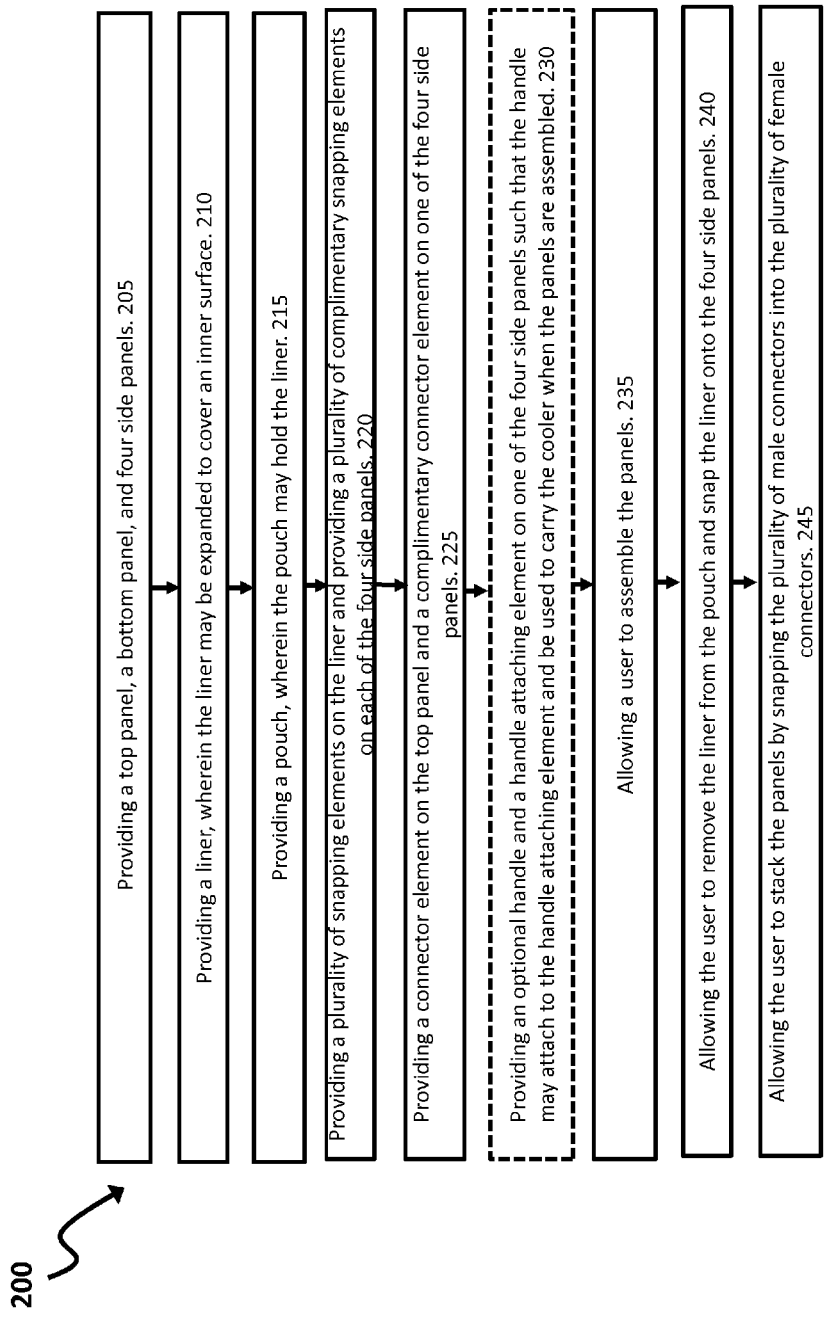
FIG. 2 illustrates a method for providing a portable, snap-together cooler.

FIG. 2 illustrates a method 200 for providing the portable, snap-together cooler 100. The method 300 may include, at block 205, providing the top panel 125, the bottom panel 135, and the four side panels 105, wherein the panels 125, 135, 105 are insulated to maintain a temperature inside the cooler 100 when the panels 125, 135, 105 are assembled, wherein the panels 125, 135, 105 have a plurality of insertion elements and a plurality of receiving elements such that the panels 125, 135, 105 may be securely connected to form a container, and wherein the panels 125, 105, 135 have the plurality of male connectors 120 on the inner surface and the plurality of female connectors 130 on the outer surface. The method 300 may include, at block 210, providing the liner, wherein the liner may be expanded to cover the inner surface. The method 300 may include, at block 215, providing the pouch, wherein the pouch may hold the liner. The method 300 may include, at block 220, providing a plurality of snapping elements on the liner and providing a plurality of complimentary snapping elements on each of the four side panels 105, wherein the liner may be secured to the four side panels 105 by snapping the plurality of snapping elements to the plurality of complimentary snapping elements. The method 300 may include, at block 225, providing a connector element on the top panel 125 and a complimentary connector element on one of the four side panels 105, wherein the connector element and the complimentary connector element may join such that the top panel 125 may rotate to open and securely close the cooler 100 when assembled. The method 300 may optionally include, at block 230, providing an optional handle and a handle-attaching element on one of the four side panels 105 such that the handle may attach to the handle-attaching element and be used to carry the cooler 105 when the panels 125, 105, 135 are assembled. The method may include, at block 235, allowing a user to assemble the panels 125, 105. 135, wherein the assembled panels 125, 105, 135 form a substantially rectangular cooler 100. The method may include, at block 240, allowing the user to remove the liner from the pouch and snap the liner onto the four side panels 105. The method may include, at block 245, allowing the user to stack the panels 125, 105, 135 by snapping the plurality of male connectors into the plurality of female connectors.

While various embodiments have been described above, it should be understood that they have been presented by way of example only, and not limitation. The descriptions are not intended to limit the scope of the presently claimed invention or to limit the scope of embodiments of the presently claimed invention. The present descriptions are intended to cover alternatives, modifications, and equivalents consistent with the spirit and scope of the disclosure.

What is claimed is:

1. A portable cooler comprising:
   a body having a substantially rectangular shape including:
   a bottom panel having a surface and a plurality of slits in the surface, the slits positioned along a perimeter of the bottom panel surface,
   four side panels, each including a side panel surface comprising:
   a bottom edge of the side panel surface, wherein the bottom edge is shaped to fit into the plurality of slits, wherein each of the four side panels have ridged sides such that the four side panels snap into the plurality of slits,
   two side edges of the side panel surface, wherein each of the two side edges is shaped to securely connect with a side edge of another side panel and form a closed container when the bottom panel and the four side panels are assembled, wherein each of the four side panels have ridged sides such that the four side panels snap together when connected, and
   a top edge of the side panel surface, wherein one of the four side panels include at least one female hinge at the top edge, and
   a top panel having at least one male hinge for insertion into the at least one female hinge such that the top panel is configured to rotate to seal and unseal the closed container, wherein the body is formed by assembling the bottom panel, the four side panels, and the top panel and is configured to be disassembled and reassembled, wherein each of the panels in the assembled body further comprises:
- a plurality of female connectors on an outer surface of the panel, and
- a plurality of male connectors on an inner surface of the panel, wherein the inner surface of the body is insulated; and wherein the plurality of male connectors and the plurality of female connectors are arranged such that the plurality of male connectors on the inner surface of one panel align with and securely snap into the plurality of female connectors on the outer surface of another panel when the top panel, the bottom panel, and the four side panels are disassembled and stacked together.

2. The apparatus of claim 1, wherein inner body surface includes a pouch containing a waterproof liner, and wherein the liner is shaped to substantially cover the inner body surface.

3. The apparatus of claim 2, wherein the liner includes a plurality of snap elements, and wherein the four side panels include a plurality of complimentary snap elements such that the liner may be secured to the four side panels by snapping the plurality of snap elements onto the plurality of complementary snap elements.

4. The apparatus of claim 1, further comprising a handle, wherein the side panels include a handle-attaching element for attaching the handle to the body, and wherein the handle may be attached and detached from the handle-attaching element.

5. The apparatus of claim 4, wherein the handle-attaching element is a hinge.

6. The apparatus of claim 1, further comprising a plurality of wheels, wherein the side panels and the bottom panel each include at least one wheel-attaching element for attaching one of the plurality of wheels to the body, wherein the plurality of wheels are attached such that the cooler travels using the wheels, and wherein the plurality of wheels are attachable and detachable from each of the wheel-attaching elements.

* * * * *